R. E. WYNN.
AUTOMOBILE TRANSMISSION GEARING.
APPLICATION FILED FEB. 13, 1909.

955,244.

Patented Apr. 19, 1910
4 SHEETS—SHEET 1.

Witnesses
Walter Troemel.
Thomas W. McMeans

Inventor
Robert E. Wynn.
Bradford Hood
Attorney

R. E. WYNN.
AUTOMOBILE TRANSMISSION GEARING.
APPLICATION FILED FEB. 13, 1909.

955,244.

Patented Apr. 19, 1910.
4 SHEETS—SHEET 2.

Witnesses
Walter Troemel.
Thomas W. McMeans.

Inventor
Robert E. Wynn.
By
Bradford Hord
Attorneys

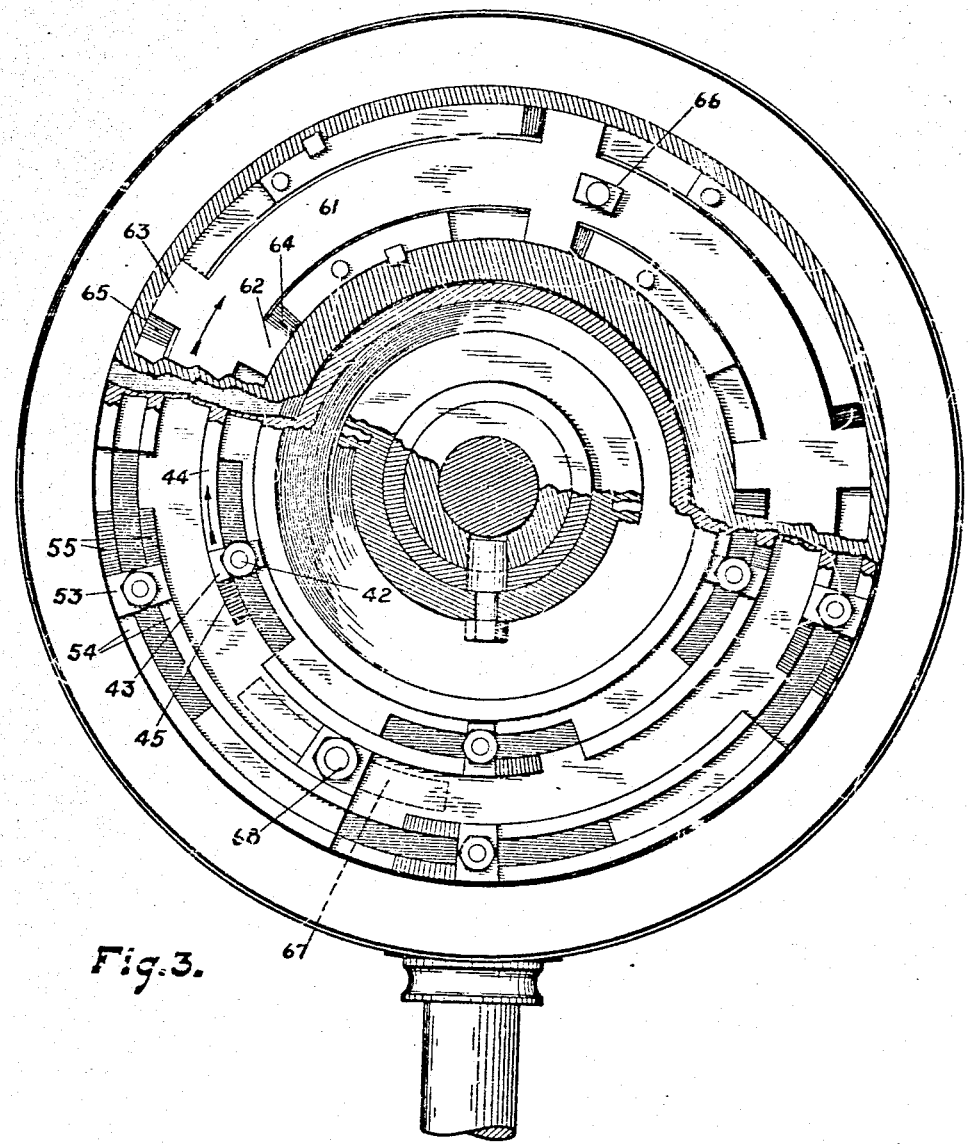

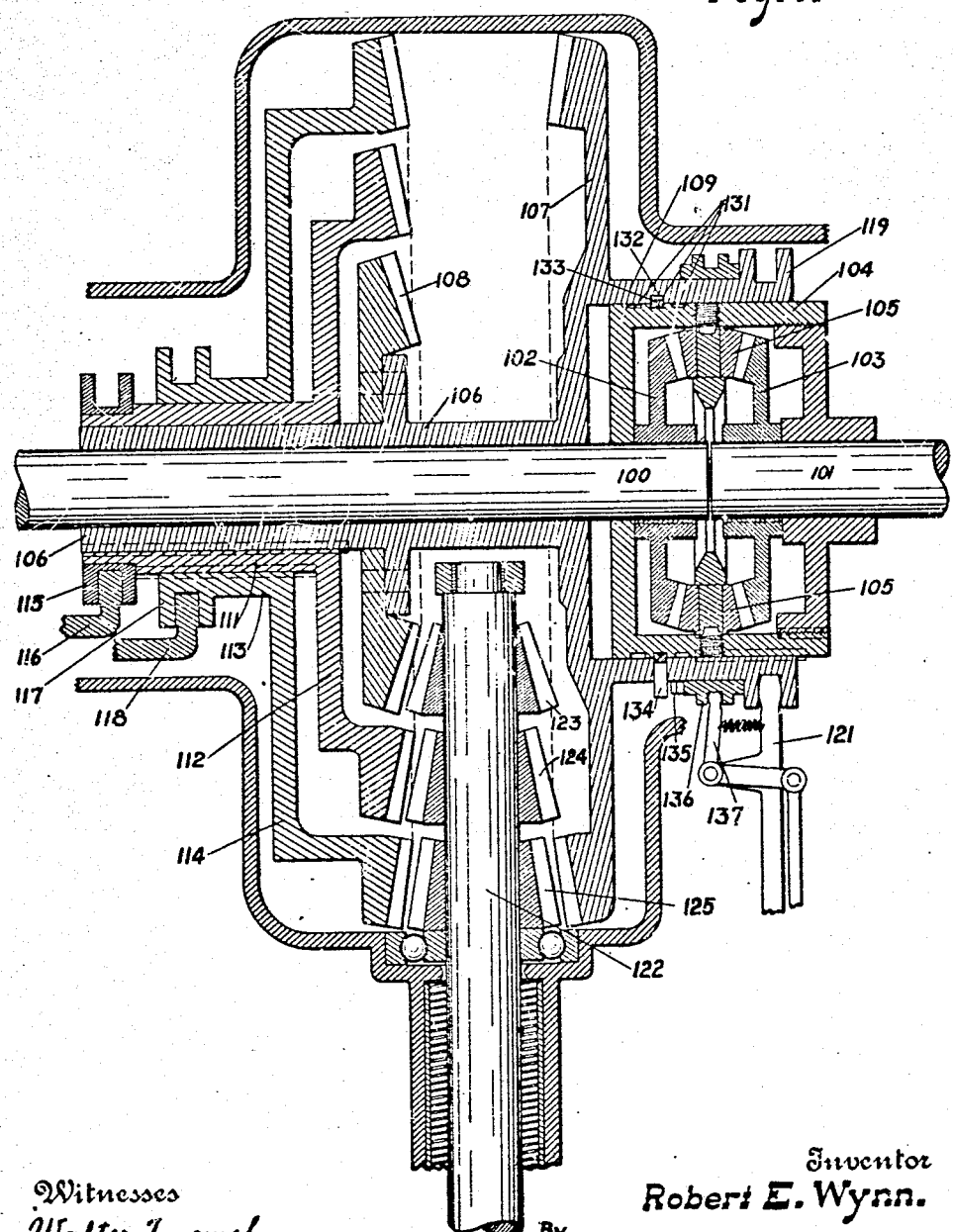

UNITED STATES PATENT OFFICE.

ROBERT E. WYNN, OF BROWNSBURG, INDIANA, ASSIGNOR OF TWO-SIXTHS TO CHARLES D. RODEBAUGH, TWO-SIXTHS TO JAMES H. KELLY, AND ONE-SIXTH TO GEORGE GRAVES, ALL OF INDIANAPOLIS, INDIANA.

AUTOMOBILE TRANSMISSION-GEARING.

955,244.  Specification of Letters Patent.  Patented Apr. 19, 1910.

Application filed February 13, 1909. Serial No. 477,587.

*To all whom it may concern:*

Be it known that I, ROBERT E. WYNN, a citizen of the United States, residing at Brownsburg, in the county of Hendricks and State of Indiana, have invented certain new and useful Improvements in Automobile Transmission-Gearing, of which the following is a specification.

The object of my invention is to produce a speed varying differential transmission gearing, especially designed for automobiles, wherein the speed varying transmission and reversing gearing is concentric with the main shaft or shaft sections and with the differential gearing thus embodying in a single structure the speed varying, reversing and differential mechanism.

The accompanying drawings illustrate my invention.

Figure 1:
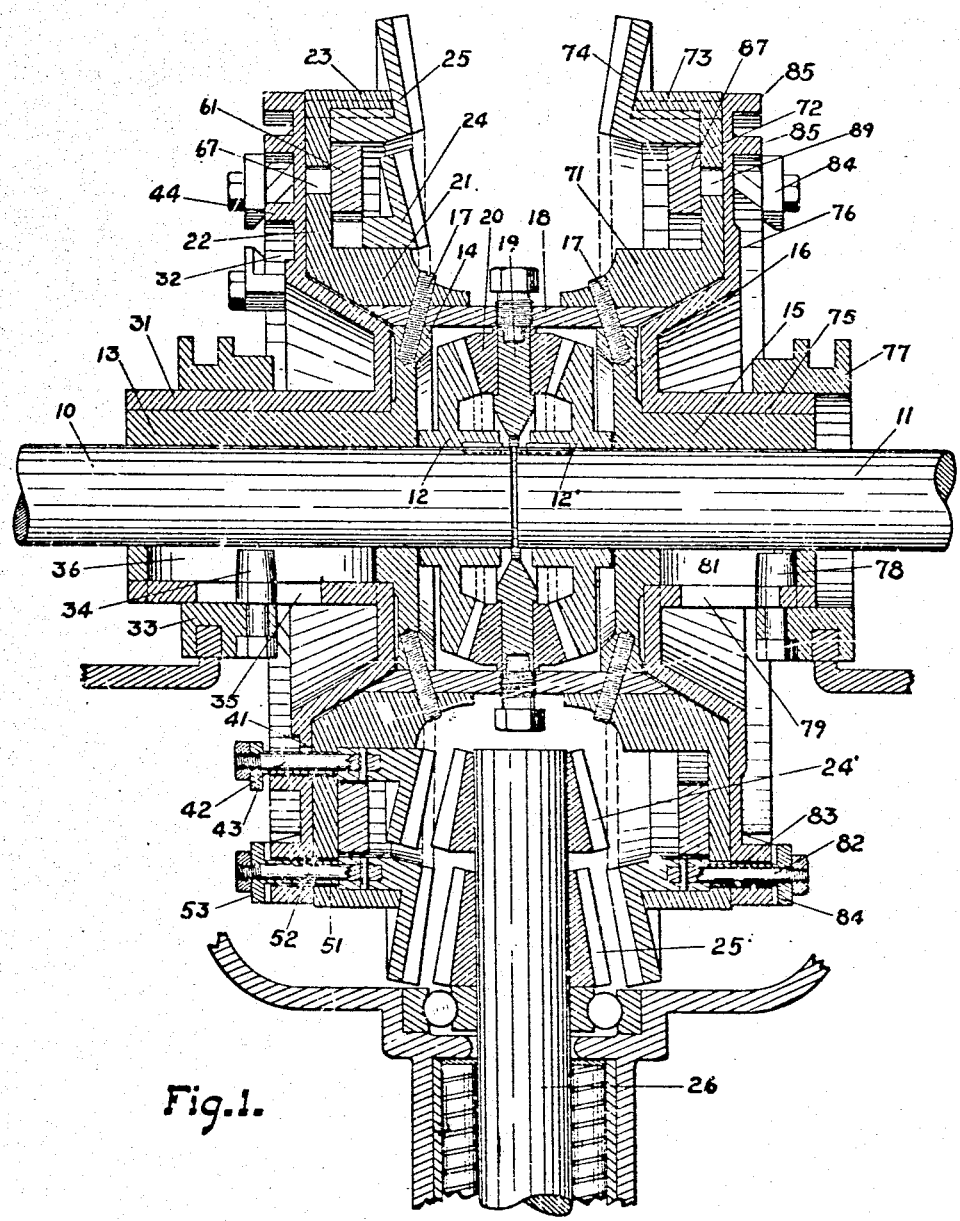
Figure 2:
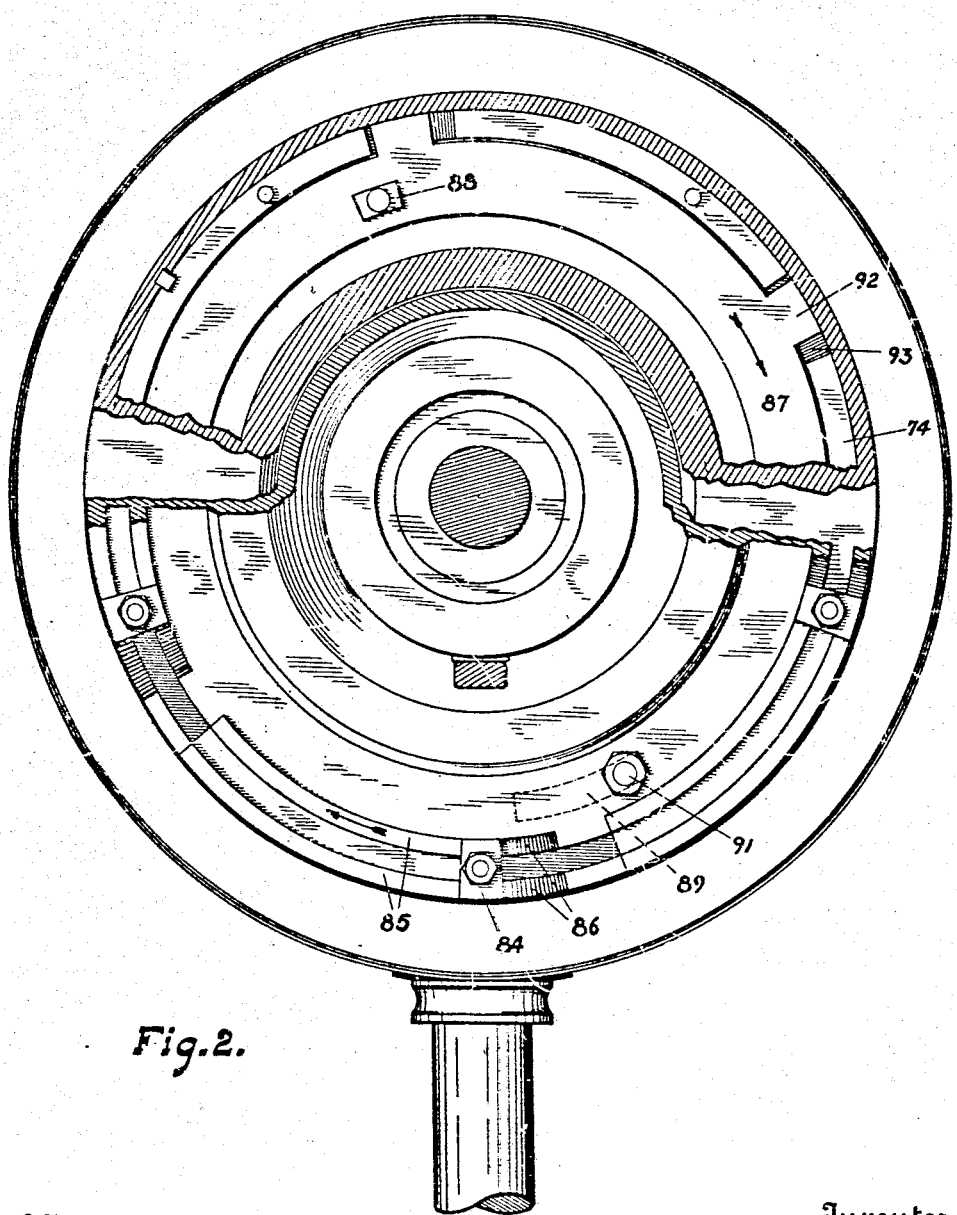

Figure 1 is an axial section, the carrying casing being shown in fragmentary condition; Fig. 2 is an elevation of one side in partial transverse section; Fig. 3 an elevation of the opposite side in fragmentary transverse section; and Fig. 4 an axial section of another embodiment of my invention.

In the drawings 10 and 11 indicate alined shaft sections to the inner adjacent ends of which are secured the central gears 12 and 12' of the differential mechanism, said gears being of any ordinary and well known type. Sleeved upon shaft 10 is a sleeve 13 provided at its inner end with a flange or head 14 and sleeved upon shaft 11 is a sleeve 15 provided at its inner end with a flange or head 16, and secured thereto by suitable means, such as screws 17, is a differential shell 18 within which is mounted a spider 19 upon which are journaled the planetary differential pinions 20 which serve to connect the central differential gears 12 and 12' in the ordinary well known manner.

Secured to shell 18 at one end thereof is the hub or central ring 21 of a plate 22 having an annular flange 23 at its outer edge. The hub 21 of plate 22 is secured to shell 18 so as to rotate therewith and conveniently the same screws 17 may be used to hold said hub in position. Splined upon hub 21 is the high speed gear 24 and splined within flange 23 of plate 22 is the low speed gear 25 both of said gears being axially movable on the carrying member. The two gears 24 and 25 are intended to coöperate respectively with a pair of driving pinions 24' and 25' which are carried upon the inner end of the driving shaft 26. Means need therefore to be provided for shifting the gears 24 and 25 axially into and out of mesh with their driving pinions in such manner that the two gears 24 and 25 cannot simultaneously be thrown into driving engagement. For this purpose I sleeve, upon sleeve 13, the hub 31 of a cam member 32 and said cam member 32 may be rotatively adjusted upon sleeve 13 (though it rotates substantially integrally with said sleeve) by means of a shifting collar 33, splined upon hub 31 and provided with a pin 34 which projects through an angling slot 35 formed in hub 31, and into an angling slot 36 formed in sleeve 13, the slots 35 and 36 extending both axially and angularly in opposite directions so that an axial reciprocation of the shifting collar 33 will cause an angular reciprocation of cam member 32 upon sleeve 13.

Secured to gear 24, and extending through slots 41 formed in cam plate 32 are pins 42 which carry fingers 43 which project over a cam ring 44 carried by cam member 32 and provided with inclined shoulders 45 with which fingers 43 coöperate, a sufficient number of pins 42 and fingers 43 being distributed around the gear 24 to operate the same evenly. Similarly gear 25 is provided with pins 52 which are projected through slots 51 and are provided at their outer ends with fingers 53 which coöperate with cam flanges 54 carried by the cam member 32 and provided with inclined shoulders 55 adapted to coöperate with fingers 53 and inclined in the opposite direction from the inclination of shoulders 45. The coöperation of fingers 43 with shoulders 45, and fingers 53 with shoulders 55, will serve to draw the gears 24 and 25 out of mesh with their driving pinions 24' and 25' and in order to positively shift said gears in the opposite direction, I mount upon the inner face of plate 22, a ring 61 provided at intervals with oppositely projecting fingers 62 and 63. Fingers 62 are projected inwardly into coöperative relation with inclined shoulders 64 formed on the hub of gear 24 while fingers 63 are projected outwardly into coöperative relation with inclined shoulders 65 formed in the hub of gear 25, the shoulders 64 and 65 being inclined in opposite directions. Ring 61 is provided with studs 66 projected through slots 67 formed in plate 22 and secured to cam member 32, for rotation therewith, by means of nuts 68.

In order to provide a reversing train I secure to the end of shell 18 opposite head 21, the head 71 of a plate 72 provided at its outer edge with an annular flange 73 within which is splined the hub of the reversing gear 74 which gear may coöperate with either pinion 24' or pinion 25' or a special pinion, but which, in the drawings, is shown as coöperating with the low speed pinion 25'. Sleeved upon sleeve 15 is the hub 75 of a cam disk 76 which may be rotatively adjusted upon sleeve 15 by means of a shifting collar 77 provided with a pin 78 projected through an angling slot 79 formed in hub 75 and into an angling slot 81 formed in sleeve 15. Gear 74 is provided with pins 82 which are projected through slots 83 formed in the cam disk 76 and provided at their outer ends with fingers 84 which coöperate with cam flanges 85 (Figs. 1 and 3) carried by the cam disk 76 and provided with inclined shoulders 86 with which fingers 84 coöperate. Arranged on the inner face of plate 72 is a ring 87 provided with spuds 88 which project through slots 89 formed in plate 72, and secured by nuts 91 to the cam disk 76, for rotation therewith. Ring 87 is provided with outwardly projecting fingers 92 arranged to coöperate with inclined shoulders 93 formed in the hub of gear 74.

The operation is as follows:—A movement of shifting collar 77 to the left (Fig. 1) will cause a rotation of the cam disk 76 and ring 87 in the direction indicated by the arrows in Fig. 2, thus causing fingers 92 to engage shoulders 93 so as to move gear 74 axially to the left into mesh with driving pinion 25', the fingers 84 at the same time sliding down the inclined shoulders 86. A return movement of the shifting collar 77 to the position indicated in Fig. 1 will move disk 76 and ring 87 in the direction opposite to that indicated by the arrows, thus bringing shoulders 86 into engagement with fingers 84 so as to draw gear 74 back to the position indicated in Fig. 1, the fingers 92 sliding down shoulders 93 during this operation. It will be seen therefore that a movement of the shifting collar 77 will cause a positive axial movement of gear 74 either into or out of engagement with driving pinion 25'. Power transmitted to the reverse driving gear 74 will cause a rotation of the differential shell 18 and a consequent rotation of the shaft sections 10 and 11, in the ordinary well known manner.

In Fig. 1 shifting collar 33 is shown in its medial position at which position fingers 53 are on the high parts of the cam rings 54 and fingers 43 are on the high parts of cam ring 44 while fingers 62 and 63 are at the bottoms of the inclined shoulders 64 and 65 respectively, so that both of the gears 24 and 25 are withdrawn from mesh with their driving pinions. A shifting of cam disk 32 in the direction indicated by the arrows in Fig. 3 will draw the inclined shoulders 45 under fingers 43 and drive fingers 62 against and upon shoulders 64 so that the high speed gear 24 will be driven axially into mesh with its driving pinion 24'. Gear 25 is not affected by this movement because the cam rings 54 will be driven farther under fingers 53, the high parts of said cam rings being sufficiently extended for that purpose as clearly shown in Fig. 3, and fingers 63 will be carried away from shoulders 65. On a return of the shifting collar 33 to its medial position, fingers 62 will be drawn back along shoulders 64 and shoulders 45 will be driven under fingers 43 so that gear 24 will be positively retracted from its driving pinion. Continued movement of the collar 33 will draw shoulders 55 from under fingers 53 and drive fingers 63 upon shoulders 65 so as to project gear 25 to the left (Fig. 1) into engagement with its driving pinion 25'. The shifting collars 33 and 77 may be actuated in any desired manner by means of separate levers or a selective lever mechanism, but the particular mechanism for operating these shifting collars forms no part of my present invention.

In Fig. 4 I show a modified and simplified construction wherein the several shiftable gears are held in desired relationship by their controlling levers instead of by shifting cams. In Fig. 4, 100 and 101 indicate two alined shafts adjacent ends of which carry the central differential gears 102 and 103 respectively. Journaled upon the adjacent ends of shafts 100 and 101 is the differential shell 104 which carries the usual differential pinions 105 meshing with gears 102 and 103. Journaled upon shaft 100 is a sleeve 106 which carries a reversing gear 107 and a high speed gear 108 which face each other. Gear 107 is provided with an annular flange 109 within which the differential shell 104 is splined. Splined upon one end of sleeve 106 is a sleeve 111 which carries a middle speed gear 112 which is cupped so as to embrace gear 108. Splined upon sleeve 111 is a sleeve 113 which carries a low speed gear 114 which gear is sufficiently cupped to embrace both gears 108 and 112, said gears 112 and 114 facing gear 107. Sleeve 111 carries a shifting collar 115 by means of which the sleeve and its gear may be shifted axially by any suitable shifting lever 116. Similarly sleeve 113 is provided with a shifting collar 117 adapted to be engaged by shifting lever 118 so that gear 114 may be shifted axially. In order to shift gears 107 and 108 axially simultaneously flange 109 is provided with a shifting collar 119 adapted to be engaged by a suitable shifting lever 121. Journaled in suitable bearings between the planes of gear 107 on one side and gears 108, 112 and 114 on the other side is the drive shaft 122 carrying a high speed pinion 123 adapted to mesh with the middle speed gear 112, and a low speed-reverse pinion 125 adapted to mesh with either the low speed gear 114 or the reverse gear 107. It may be desirable not to depend upon the lever 121 to hold gear 107 against axial movement and therefore some suitable means may be provided for this purpose. In the drawings I show the differential shell 104 provided with three circumferential grooves 131 and the hub 109 provided with a circumferential groove 132. Mounted in groove 132 is an expansible ring 133 which is also adapted to take into one of the grooves 131. The adjacent ends of the ring 133 are turned outwardly to form fingers 134 adapted to be separated by a wedge 135 carried by a collar 136 mounted upon hub 109 and movable into and out of engagement with the finger 134 by means of a lever 137 carried upon lever 121.

I claim as my invention:

1. The combination, with a driving member, of a driven member having its axis at an angle to the axis of the driving member, a driving gearing comprising a pair of alined shafts, a differential gearing having a main body and gears connecting said shafts, a plurality of concentric gears carried by the main body of the differential gearing and axially movable thereon, means for axially shifting said concentric gears independently, and means embodied within the structure and rotating therewith to lock the shiftable gears in their different relations.

2. The combination of a rotatable member, a concentric gear mounted thereon and axially movable thereon, a pair of shifting members mounted upon the main rotatable member and rotatably adjustable thereon, and intermediate connections between said shifting members and the gear whereby rotative adjustment of the shifting members will positively shift the gear axially in either direction upon the main rotatable member.

3. The combination of a main rotatable member, a pair of concentric gears carried thereby and independently axially movable thereon, a pair of shifting members mounted upon the main rotatable member and rotatively adjustable thereon, and intermediate connections between said shifting members and said pair of gears for positively shifting said gears in opposite directions by rotative adjustment of the shifting members.

4. A driving gearing comprising a pair of alined shaft sections, a differential gearing connecting said shaft sections, three coaxial driving gears carried by said differential gearing and shiftable axially thereon, a driving shaft, a pair of driving pinions arranged in coöperative relation with said driving gears, and means for independently shifting said driving gears axially into and out of mesh with the driving pinions.

5. A driving gearing comprising a pair of alined shaft sections, a differential gearing connecting said shaft sections, three coaxial driving gears carried by said differential gearing and shiftable axially thereon, a driving shaft, a pair of driving pinions arranged in coöperative relation with said driving gears, a pair of shifting members carried on the differential gearing and rotatively adjustable, intermediate connections between said pair of shifting members and two of the driving gears for positively shifting said gears axially in opposite directions, a second pair of shifting elements also carried by the differential gearing and intermediate connections between said second pair of shifting elements and the remaining driving gear for positively axially shifting the same.

In witness whereof, I have hereunto set my hand and seal at Indianapolis, Indiana, this 8th day of February, A. D. one thousand nine hundred and nine.

ROBERT E. WYNN. [L. S.]

Witnesses:
ARTHUR M. HOOD,
KATHERINE C. FLETCHER.